Nov. 3, 1925.

G. B. WILLCOX 1,559,924

SAFETY DEVICE FOR DISINTEGRATING MACHINES

Filed April 2, 1924

George B. Willcox
INVENTOR.

Patented Nov. 3, 1925.

1,559,924

UNITED STATES PATENT OFFICE.

GEORGE B. WILLCOX, OF SAGINAW, MICHIGAN, ASSIGNOR TO MITTS & MERRILL, OF SAGINAW, MICHIGAN, A CORPORATION OF MICHIGAN.

SAFETY DEVICE FOR DISINTEGRATING MACHINES.

Application filed April 2, 1924. Serial No. 703,621.

*To all whom it may concern:*

Be it known that I, GEORGE B. WILLCOX, a citizen of the United States, residing at Saginaw, in the county of Saginaw and State of Michigan, have invented certain new and useful Improvements in Safety Devices for Disintegrating Machines; and I do hereby declare the following to be a full, clear, and exact description of the invention, such as will enable others skilled in the art to which it appertains to make and use the same.

This invention relates to disintegrating machines or cutting machines, as for example, the type commonly known as cylinder hogs, in which a revolvable knife-carrying or blade-carrying drum or cylinder is mounted in a frame having an inlet hopper or throat at one side of the cylinder, and a discharge outlet.

Between the inlet and the discharge openings is a plurality of fixed cutter bars so arranged that material fed into the throat will be cut against the cutter bars in sequence, that is, pieces that are cut by the knives against the first bar will be recut against each of the succeeding bars until the finely divided product is discharged from the outlet.

These machines are subjected to hard usage and are of massive construction so that they can withstand great internal strains when material that is especially tough or of unusual size is fed to the machine.

It sometimes happens that pieces of iron or chunks of material of unusual size come against the first of the fixed series of cutter bars and are struck by the drum knives or blades traveling at high speed. The resulting unusual impact may damage the machine if the resistance of the material is great enough. Heretofore much difficulty has been experienced from that cause, and also by reason of stray chunks of iron etc. being driven into the series of fixed cutter bars.

It is the purpose of my present invention to provide a simple and effective means by which the first cutter bar of the series, when subjected to excessive strains which otherwise might break the machine, will automatically become detached from its rigid position on the frame and move away freely and automatically from the knives or blades of the drum, leaving a large opening in the frame through which the obstruction or the large chunk of uncut material may be discharged from the machine before it can come into contact with the succeeding cutter bars.

My present improvement relates more specifically to an improved means by which the first cutter bar of the series is normally held rigidly to the machine, but is released when the bar is subjected to excessive impact or strain, the release being effected by the fracture of a safety member or strut, which constitutes the subject of my invention. The cutter bar then drops away freely from the drum knives.

With the foregoing and certain other objects in view which will appear later in the specifications, my invention comprises the devices described and claimed and the equivalents thereof.

In the drawings, Fig. 1 is a sectional side view of a machine embodying my improvement.

Fig. 5 is an end view of the device for clamping the socket piece shown in Fig. 2.

Figure 1:
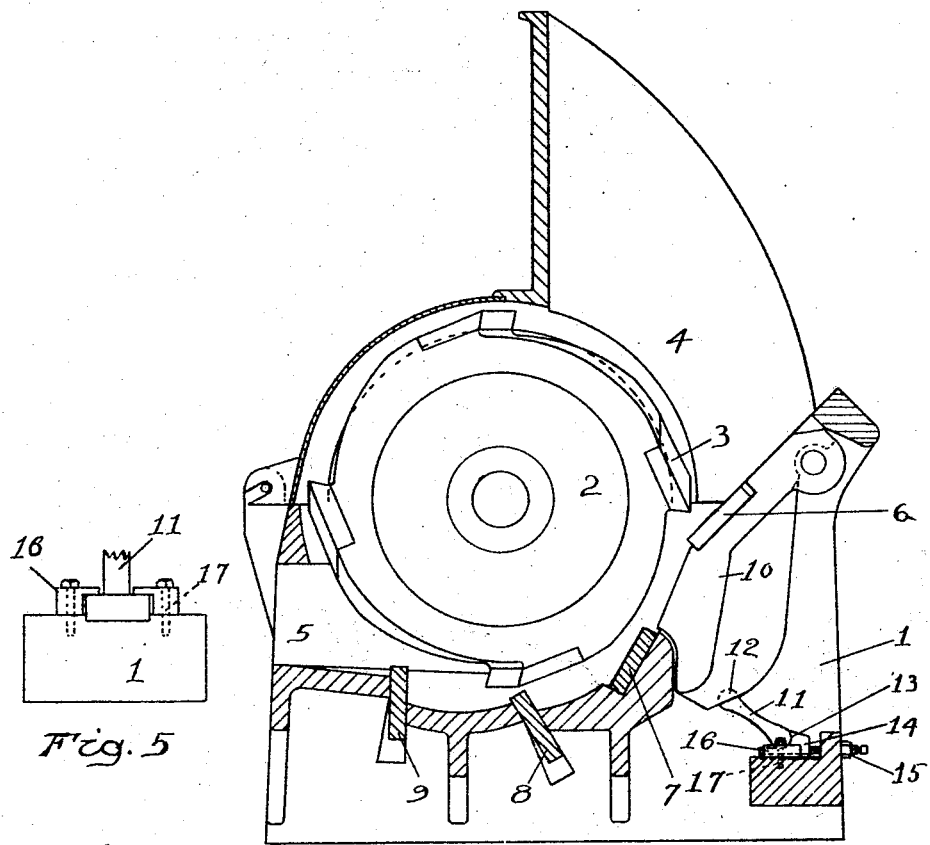

As is clearly shown in the drawings, 1 is the frame of the hog and 2 the usual revolving drum with knives or blades 3 around its periphery. 4 is the throat and 5 the discharge outlet for finished material. 6 is the first cutter bar of a series, 6—9, arranged around the periphery of the drum between the throat and the discharge outlet.

As previously stated, my present improvement relates to an emergency release device for the first bar 6, which is normally fixed with relation to the drum 2, but in emergency is capable of swinging back and thus opening the lower part of the throat 4 to discharge an obstruction therefrom before the obstruction can damage the succeeding bars of the series.

In hogs of this class there has heretofore been employed a safety shearing or breaking pin to hold the bar 6 normally in position, this bar being mounted on a door or equivalent closure hinged to the frame 1. The safety pin was sheared or broken transversely when the door was subjected to a sufficiently heavy impact.

Figure 2:
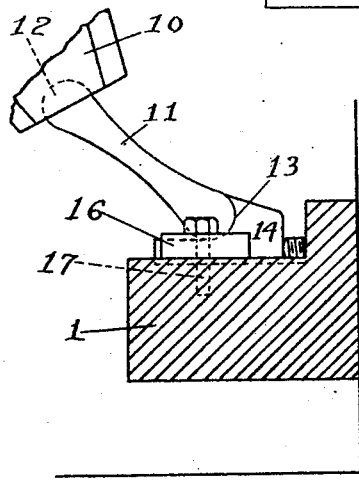
Fig. 2 is an enlarged detail of the strut and its mounting.

In my present improvement, instead of a pin that yields by shearing I employ a strut 11, preferably applied as shown in Figs. 1 and 2, where one end of the strut is seated in a socket 12 on the door 10 and the other end is seated in a socket 13 on the frame 1. The socket 13 is preferably adjustable toward and from the door. It is formed in a slidable block 14 that can be adjusted back and forth by an adjusting screw 15 or its equivalent, and clamped to the frame by lugs 16 and bolts 17.

Figure 3:
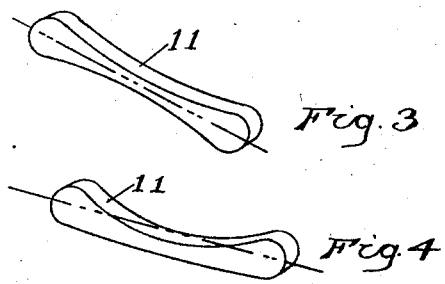
Figs. 3 and 4 are perspective views of approved forms of struts.
Figure 4:

The strut 11 may be made of any suitable material, but I prefer cast iron. The cross-sectional shape of the strut is not essential. It may be as shown in Fig. 3 or Fig. 4, or of any other suitable form adapted to break when subjected to sufficient longitudinal compression, as is a column. This strut, while capable of breaking to permit the door to open when subjected to excessive strains that would otherwise break the machine, operates in quite a different manner and has certain advantages over the shearing pin constructions above referred to. While the shearing pin construction is satisfactory in practice for many kinds of machines, it is preferable, where the machine is to be subjected to heavy duty, to provide a form of safety device that will not become weakened by crystallization, or by reduction of cross section caused by incipient shearing incident to continued use under strains that are within the normal capacity of the machine.

It has been found that shearing pins, owing to the fact that they are continually subjected to jolts and vibrations in the normal use of the machine, have become weakened in the manner stated and that after a sufficient length of time has elapsed they may even give way under normal strains.

Using my present strut construction, since the material of the member 11 is subjected to longitudinal compression only, it will, withstand such strains and its strength will not noticeably depreciate with use. It is, however, always capable of giving way the first time the door is subjected to an excessive amount of strain. The arrangement of the strut is such that it can be easily and quickly replaced by simply swinging the door 10 back into working position, inserting a new strut 11 and tightening it by means of the socket adjusting bolt 15 and the clamping lugs 16.

While I have shown and described only the first cutter bar, 6, of the series as being mounted on the door 10, it is obvious that in some instances it may be desirable to also mount other bars of the series, as the second bar 7, on the door, and I, therefore, on occasion so mount it, without departing from the spirit of my invention.

Having thus described my invention, what I claim and desire to secure by Letters Patent is:

In a machine of the class described having an inlet throat, the bottom of said throat slightly inclined and having an end section hinged, a cutter bar fixed to the end of said hinged section and forming a continuation of said flat throat bottom for the passage of material thereon, a downwardly extending angularly disposed wall on the inner end of said hinged section and integral therewith, a socket on the back of said wall at its lower end, a stationary support, a second socket adjustably mounted on said support, a breakable strut interposed between said sockets, said strut having its cross section proportioned to withstand certain predetermined endwise stresses and to fail under greater stresses, and means for adjusting said second socket to prevent end play of said strut, for the purposes set forth.

In testimony whereof, I affix my signature.

GEORGE B. WILLCOX.